United States Patent Office 3,845,003
Patented Oct. 29, 1974

3,845,003
CHEMICAL OVERLAY SOLUTION WITH NON-TOXIC PLASTICIZERS FOR SEDIMENT CONTROL
Thorndyke Roe, Jr., Oxnard, Calif., assignor to the United States of America as represented by the Secretary of the Navy
No Drawing. Filed Dec. 5, 1973, Ser. No. 422,122
Int. Cl. C08f 45/40
U.S. Cl. 260—31.8 H               2 Claims

ABSTRACT OF THE DISCLOSURE

A resin solution comprising a sea-water-insoluble, non-toxic resin-plasticizer system dissolved in a sea water soluble solvent. Also, an antistatic agent is contained in the solution to enhance spreadability. The resin solution is fed through an extrusion head disposed underwater and in close proximity to the sediment of the ocean floor. The resin-plasticizer system of the solution has a relative high specific gravity greater than 1.0 so that, when the system precipitates in the sea-water, it drops onto the sediment. Preferably, the extrusion head is moved along at a controlled rate to form a continuous sheet of a desired thickness.

BACKGROUND OF THE INVENTION

1. Field of Invention

The present invention relates to processes or techniques for settling loose or suspended sea floor sediment to improve underwater visibility. In particular, it relates to plastic films adapted for these purposes.

2. Description of the Prior Art

In many underwater operations, such as salvage operations, or the more recently conducted Sealab tests, it is highly desirable to provide maximum visibility, and, of course, loose sediment, such as is commonly found on the ocean floor, seriously restricts visibility when it is stirred into a suspended state. In such situations, it becomes necessary to wait until the sediment again settles and, since time is a critical factor in any underwater operation, the waiting period presents real problems.

Another problem frequently experienced in underwater operations arises when the operator accidentally drops a hand tool or other oceanographic instruments onto the heavy layer of silt deposited on the ocean floor. Due to the weight of these objects, they become deeply imbedded in the silt and frequently are lost or, at least, require a substantial recovery time.

One prior art method of overcoming these problems involves the use of a plastic film extruded over the sediment. However, such plastic film introduce toxic agents into the ocean. These plastic films contain highly toxic plasticizers, such as chlorinated biphenyls and chlorinated triphenyls, which are deleterious to the ocean environment. In addition, such prior art plastic films are somewhat difficult to spread due to static electricity inherent in the film.

SUMMARY

The present invention minimizes the foregoing difficulties by forming a sediment-blanketing non-toxic plastic film sheet directly on the loose sea floor sediment. To form the sheet, a solution formed of a sea-water-insoluble non-toxic resin-plasticizer system dissolved in a sea water miscible solvent is extruded from a container through a submerged extrusion head directly onto the sediment. The resin system has a relatively high specific gravity so that the precipitate drops through the sea water onto the sediment and, to provide a continuous sheet, the extrusion head simply is moved along the sediment at a controlled rate. Also, an antistatic agent is contained to the solution to enhance spreadability. Typical formulations for the solution are set forth in the ensuing detailed description.

As already indicated, a primary object of the invention is to provide a means for forming continuous plastic sheet directly on loose sea floor sediment.

A related object is to form a sheet which becomes a flexible platform capable of supporting light loads as well as preventing loss of items accidentally dropped during underwater operations.

Another object is to form a sediment-blanketing sheet the strength of which increases with time.

Another object is to form a non-toxic sediment-blanketing sheet.

Another object is to provide a resin-plasticizer system with specific gravity greater than 1.0.

Another object is to enhance spreadability of a plastic film.

Other objects, advantages and novel features of the invention will become apparent from the following detailed description of the invention.

DETAILED DESCRIPTION OF THE INVENTION

The apparatus used in carrying out the present process is not part of the present invention and, since it can be provided in a variety of well-known manners, it would seem that the present invention is capable of being readily understood without the need of special drawings or illustrations. In general, the apparatus may include a reservoir for containing the film-forming solution and the reservoir should be connected to a dispensing head equipped with a shutoff valve and an extrusion slit. In carrying out the process the reservoir is filled with the solution and then submerged into close proximity with the sediment on the ocean floor. The valve is opened and the solution is permitted to escape through the extrusion slit. In actual practice, it will be found that some means for pressurizing the solution greatly facilitates the escape and, for this purpose, the reservoir may be coupled by a conduit to a pneumatic source or, if desired, a flexible or collapsible bag-type reservoir can be employed to make use of the compressive forces of undersea pressures to facilitate removal or extrusion of the plastic film-forming substance. Pressure is desirable since, as will be explained, the resin in the solution commences to solidify and precipitate immediately upon being exposed to the sea water environment.

With regard to the film-forming solution, the following are typical or representative formulations in parts by weight which, in practice, have been found to provide a continuous flexible non-toxic plastic film capable of covering the ocean floor sediment and preventing the sediment from becoming disturbed and suspended in the sea water. Also, these non-toxic plastic films were found to have a strength sufficient to support light loads and a strength which increased with deposit time:

A.

| | |
|---|---|
| Polyvinyl butyral resin | 1.0 |
| 2-(2-ethoxyethoxy) ethanol | 28.4 |
| Citric acid | 13.4 |
| Dibutyl Phthalate | 7.9 |
| Dimethyldicocoammonium chloride 75% active | 0.1 |

B.

| | |
|---|---|
| Polyvinyl butyral resin | 1.0 |
| 2-(2-ethoxyethoxy) ethanol | 24.6 |
| Chlorinated Paraffins | 12.0 |
| Dibutyl Phthalate | 6.0 |
| Dimethyldicocoammonium chloride, 75% active | 2.1 |

If desired, a dye such as Rhodamine B can be included in the formulation to render the deposited plastic sheet readily visible to the operator.

It is highly essential in formulating the solution to use a resin-plasticizer system which has a specific gravity greater than 1.0 and, preferably, a significantly greater than 1.0 so as to minimize any suspension of the plastic in the water. In other words, the precipitated resin plastic system must have a unit volume weight high enough to promote its dropping from the extrusion head onto the sea floor sediment. In the foregoing formulation, the non-toxic plasticizer is incorporated to adequately increase the unit volume weight of the system although, of course, the non-toxic plasticizer also performs its customary function of rendering the film flexible.

Also, included in the solution is an antistatic agent to reduce the static electricity on the extruded plastic film. This enhances the spreading of the plastic film by allowing the film to spread in thinner sheets than would otherwise be possible. The antistatic agent utilized in the present invention is Dimethyldicocoammonium chloride 75% active.

The other significant factor in the formulation is the use of a solvent which itself is miscible and preferably soluble in sea water. Consequently, when the solution initially is exposed to the sea water, the solvent commences to dissolve in the sea water permitting the resin system to precipitate out in a desired manner. The initial film formed by the precipitation is sufficiently cohesive to provide a continuous sheet although, as will be apparent, the toughness or strength of the sheet will not be achieved until the solvent has completely dissolved in the water. It is for this reason that the strength of the film increases with time.

Obviously, many modifications and variations of the present invention are possible in the light of the above teachings. It is therefore to be understood that within the scope of the appended claims of the invention may be practiced otherwise than as specifically described.

I claim:

1. A solution for forming a continuous, non-toxic, plastic sheet of a desired thickness on the ocean floor consisting essentially of a mixture having the following formulation as expressed in parts by weight:

| | |
|---|---|
| Polyvinyl butyral resin | 1.0 |
| 2-(2-ethoxyethoxy) ethanol | 28.4 |
| Citric Acid | 13.4 |
| Dibutyl phthalate | 7.9 |
| Dimethyldicocoammonium chloride, 75% active | 0.1 |

2. A solution for forming a continuous non-toxic, plastic sheet of a desired thickness on the ocean floor consisting essentially of the following formulation as expressed in parts by weight:

| | |
|---|---|
| Polyvinyl butyral resin | 1.0 |
| 2-(2-ethoxyethoxy) ethanol | 24.6 |
| Chlorinated paraffins | 12.0 |
| Dibutyl phthalate | 6.3 |
| Dimethyldicocoammonium chloride, 75% active | 2.1 |

References Cited
UNITED STATES PATENTS

| | | | |
|---|---|---|---|
| 2,294,228 | 8/1942 | Derby | 260—31.8 G |
| 2,182,359 | 12/1939 | Smith et al. | 260—31.8 G |
| 2,360,306 | 10/1944 | Mason | 260—31.8 H |

LEWIS T. JACOBS, Primary Examiner

U.S. Cl. X.R.

260—31.8 G, 33.2 R, 33.8 R